3,051,711
DYES OF THE PERINAPHTHOYLENE-
BENZIMIDAZOLE SERIES
Fritz Graser, Ludwigshafen (Rhine), Germany, assignor to Badische Anilin- & Soda-Fabrik Aktiengesellschaft, Ludwigshafen (Rhine), Rheinland-Pfalz, Germany
No Drawing. Filed Sept. 27, 1960, Ser. No. 58,631
Claims priority, application Germany Sept. 29, 1959
4 Claims. (Cl. 260—282)

This invention relates to dyes of the perinaphthoylene-benzimidazole series of the general formula:

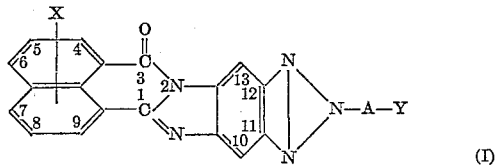

and to a process for the production of such dyes.

In Formula I, X represents a hydrogen atom or one of the substituents usual in the chemistry of dispersion dyes, preferably a nitro group, an amino group, such as a tertiary, secondary or especially primary amino group, or an acylamino group, for example an acetylamino group, in one of the positions 5, 6, 7 and 8, and the triazole ring is attached in one of the positions 10, 11 or 11, 12 or 12, 13 to the benzene ring of the perinapthoylene-benzimidazole system. The divalent radical A in Formula I represents an arylene radical, preferably an arylene radical which contains up to two benzene rings, such as a phenylene radical or a naphthylene radical, and Y represents a hydrogen atom or one of the substituents usual in the chemistry of dispersion dyes, preferably a low molecular weight alkyl or alkoxyl radical, a halogen atom, especially a chlorine atom, an acylamino group, for example an acetylamino group, an amidosulfonyl group, such as a N,N-dimethylamidosulfonyl group, or an aryl radical, especially a phenyl radical. In the phenylene radicals A, the radical Y may be in one of the positions ortho, meta and para to the radical of the triazole ring and the naphthalene radicals A may be attached at the 1- or 2-position to the triazole ring. When the amino groups are substituted by alkyl groups or acyl groups, low molecular weight substituents are preferred in view of their being more readily accessible; by low molecular weight we understand those with 1 to about 4 carbon atoms.

I have found that the said valuable dyes of the perinaphthoylene-benzimidazole series are obtained by condensing a 2-arylbenzotriazole which contains in the benzo ring two adjacent primary amino groups with a naphthalene-1,8-dicarboxylic acid or an anhydride thereof or by reacting a 2-arylbenzotriazole which contains in the benzo ring in adjacent position to a primary amino group at least one radical capable of being converted into a primary amino group, with a naphthalene-1,8-dicarboxylic acid or an anhydride thereof, converting into a primary amino group the radical capable of being converted into an amino group and further condensing this reaction product to the perinaphthoylene-benzimidazole dye.

2-arylbenzotriazoles which bear two vicinal primary amino groups are 2-aryl-diaminobenzotriazoles. These are condensed in the usual way with the naphthalene-1,8-dicarboxylic acids or their anhydrides, for example by heating the initial materials in the absence or presence of diluents, such as acetic acid, monochlorbenzene, dichlorbenzene, nitrobenzene, naphthalene or pyridine, or in the presence of water under pressure. The 2-aryl-diaminobenzotriazoles may be used in the same molar amounts as the naphthalene-1,8-dicarboxylic acids or their anhydrides, or also in excess.

In the same way, 2-arylbenzotriazoles which contain in the benzo ring in neighboring position to a primary amino group at least one radical convertible into a primary amino group are reacted with naphthalene-1,8-dicarboxylic acids or their anhydrides; then the radicals convertible into amino groups are converted into amino groups and the reaction products further condensed, for example by heating, possibly in the presence of dehydrating agents, such as acetic anhydride, or high boiling diluents, such as nitrobenzene, dichlorbenzene, trichlorbenzene, and naphthalene. The perinaphthoylene-benzimidazole dyes may also be formed partly or completely during the conversion of the radicals convertible into amino groups into amino groups.

2-arylbenzotriazoles which bear vicinal primary amino groups in the benzo ring include 2-phenyl-4,5- and -5,6-diaminobenzotriazole and 2-naphthyl-5,6-diaminobenzotriazole. The 2-aryldiaminobenzotriazoles may contain further substituents in the aryl radicals, such as halogen atoms, alkyl, hydroxyalkyl, cycloalkyl, aralkyl, aryl, hydroxy, alkoxy, aryloxy, acyl, amino, acylamino, cyano and/or sulfonic acid amide groups and, for example, halogen atoms and/or alkyl groups in the benzo ring. Perinaphthoylene-benzimidazole dyes which bear these or other substituents in the benzo ring of the benzimidazole radical also form part of the subject-matter of this invention.

Substituted 2-arylbenzotriazoles which bear no further substitutents in the benzo ring include: 2-(2-methoxyphenyl)-5,6-diaminobenzotriazole, 2-(3-methoxyphenyl)-5,6-diaminobenzotriazole, 2-(4-methoxyphenyl)-5,6-diaminobenzotriazole, 2-(2-methylphenyl)-5,6-diaminobenzotriazole, 2-(3-methylphenyl)-5,6-diaminobenzotriazole, 2-(4-methylphenyl)-5,6-diaminobenzotriazole, 2-(2-chlorphenyl)-5,6-diaminobenzotriazole, 2-(3-chlorphenyl)-5,6-diaminobenzotriazole, 2-(4-chlorphenyl)-5,6-diaminobenzotriazole, 2-(3-dimethylsulfonylaminophenyl)-5,6-diaminobenzotriazole and 2-(4-dimethylsulfonylaminophenyl)-5,6-diaminobenzotriazole.

2-arylbenzotriazoles which bear in the benzo ring in neighboring position to a primary amino group at least one radical convertible into a primary amino group such as a halogen atom or a nitro group, include 2-aryl-5-amino-6-halogenbenzotriazoles and 2-aryl-5-amino-6-nitrobenzotriazoles.

The 2-arylbenzotriazoles which may be used as initial materials may be prepared in the usual way, for example by coupling aromatic diazo compounds with 1,3-diaminonitrobenzenes or 1,3-diaminohalogenbenzenes and treatment of the resultant azo compounds with oxidizing agents, such as ammoniacal copper sulfate solution. The 2-aryl-5-aminobenzotriazoles thus obtained may be used directly for the production of the new dyes by condensing them with naphthalene-1,8-dicarboxylic acids or their anhydrides, then converting the radical convertible into an amino group into an amino group, for example a nitro group by reduction and a halogen atom by reaction with water and ammonia under pressure, possibly in the presence of a catalyst such as copper powder, and further condensing the reaction product to the perinaphthoylene-benzimidazole dye.

However, the 2-aryl-5-aminobenzotriazoles may be first reacted into 2-aryldiaminobenzotriazoles in the manner just described and the latter then condensed with naphthalene-1,8-dicarboxylic acids or their anhydrides.

Other possibilities for the preparation of the 2-arylbenzotriazoles required as initial materials consist in coupling aromatic diazo compounds with 2-aryl-5-aminobenzotriazoles and subsequent reductive splitting of the 2-aryl-4-arylazo-5-aminobenzotriazoles obtained to 2-aryl-4,5-diaminobenzotriazoles, or in the nitration of 2-aryl-5-acetylaminobenzotriazoles to 2-aryl-4-nitro-5-acetylamino-benzotriazoles and deacetylation and reduction of the reaction products to 2-aryl-4,5-diaminobenzotriazoles.

The naphthalene-1,8-dicarboxylic acids or their anhydrides used for the production of the new dyes may also bear further radicals, such as halogen atoms, amino, acylamino, nitro and/or acyl groups.

I have further found that valuable dyes of the perinaphthoylene-benzimidazole series which are eminently suitable for dyeing and printing textile materials of linear polyesters are obtained according to the above-mentioned processes when 2-arylbenzotriazoles which contain in the benzo ring in vicinal position to a primary amino group at least one radical convertible into a primary amino group are reacted with naphthalene-1,8-dicarboxylic acids or their anhydrides, the radical convertible into a primary amino group is converted into a primary amino group and this reaction product is further condenser to a perinaphthoylene-benzimidazole dye, and all these measures are carried out simultaneously in one and the same reactor.

The dyes of the general formula:

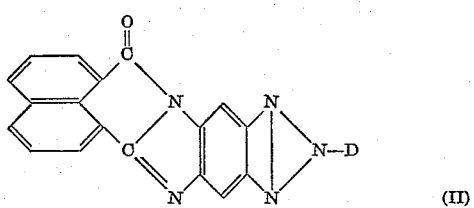

(II)

in which D represents a phenyl radical, a methoxyphenyl radical or a naphthyl radical, obtainable according to this invention, are of special industrial interest.

The new dyes are suitable for dyeing and printing textile materials, such as fibers, flock, threads, filaments, woven and knitted fabrics, fleeces, or films, sheets and shaped articles of linear fiber-forming polyesters, for example polyethyleneglycol terephthalate, for spin-dyeing cellulose esters and for bulk dyeing articles of linear fiber-forming polyesters as well as synthetic materials, such as polyamides and polyvinyl compounds. Moreover, they are suitable as pigment dyes, for example for dyeing lacquers, varnishes, waxes and paper.

The dyeing of textile materials, such as fibers, threads, flock, woven and knitted fabrics of linear polyesters, for example polyethyleneglycol terephthalate or polyesters based on terephthalic acid and 1,4-dimethylolcyclohexane, may be carried out in the usual way, for example from an aqueous bath at 100° C. or higher temperatures under pressure, advantageously with the coemployment of the usual dyeing accelerators (carriers), possibly together with one or more of the usual dyeing auxiliaries. Dyeings are obtained in powerful, vivid and bright shades of good light fastness and excellent thermal stability.

The new dyes are superior in their affinity to linear fiber-forming polyesters and in their thermofixation fastness and sublimation fastness to similar dyes described in the literature.

The following examples will further illustrate this invention but the invention is not restricted to these examples. The parts and percentages are by weight.

*Example 1*

10.8 parts of naphthalene-1,8-dicarboxylic acid are heated at the boil for 36 hours with 100 parts of glacial acetic acid and 11.25 parts of 2-phenyl-5,6-diaminobenzotriazole. The mixture is allowed to cool to 60° to 70° C., the precipitate filtered off and washed with a little glacial acetic acid and then with water until the reaction is neutral. After drying, a dye is obtained in a good yield which dyes polyethylene glycol terephthalate bright yellow shades of excellent light and thermofixation fastness and which is constituted as follows:

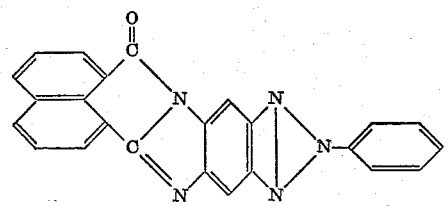

(III)

If 11.25 parts of 2-phenyl-5,6-diaminobenzotriazole be used instead of 13.8 parts, a very similar dye is obtained which dyes polyethylene glycol terephthalate in somewhat more reddish yellow shades with the same excellent fastness properties.

*Example 2*

A mixture of 10.8 parts of naphthalene-1,8-dicarboxylic acid, 15.3 parts of 2-(4-methoxyphenyl)-5,6-diaminobenzotriazole and 160 parts of glacial acetic acid is heated at the boil for 3½ hours, cooled to 80° C. and the precipitate filtered off. After working up as in Example 1 a dye is obtained which dyes polyethylene glycol terephthalate bright yellow shades of very good light and thermofixation fastness. The new dye has the following constitution:

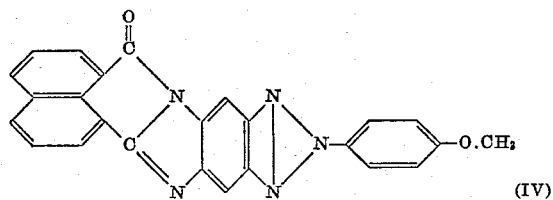

(IV)

If 2-(3-methoxyphenyl)-5,6-diaminobenzotriazole be used instead of 2-(4-methoxyphenyl)-5,6-diaminobenzotriazole and 125 parts of glacial acetic acid instead of 160 parts, a dye with similar properties is obtained which has the following formula:

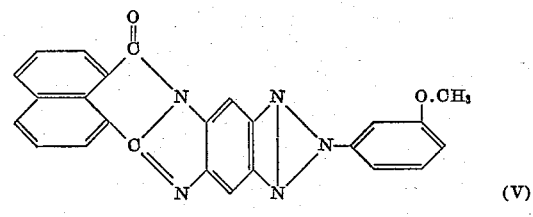

(V)

*Example 3*

A mixture of 10.8 parts of naphthalene-1,8-dicarboxylic acid, 15.3 parts of 2-(2-methoxyphenyl)-5,6-diaminobenzotriazole and 100 parts of glacial acetic acid is heated to boiling in the course of an hour and the mixture kept boiling for 36 hours. After cooling to room temperature, the mixture is worked up as in Example 1 and a dye is obtained which dyes polyethylene glycol terephthalate bright yellow shades of very good light and thermofixation fastness. The new dye has the following structure:

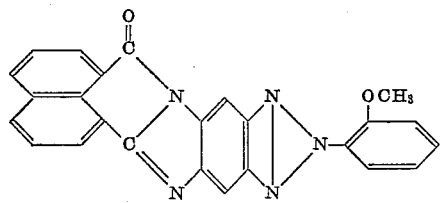

(VI)

*Example 4*

A mixture of 14.4 parts of naphthalene-1,8-dicarboxylic acid, 19.9 parts of 2-(4-methylphenyl)-5,6-diaminobenzotriazole and 140 parts of glacial acetic acid is heated to boiling in the course of an hour and kept at this temperature for 3½ hours. It is then allowed to cool to 80° C. and is worked up as in Example 1. A yellow dye is obtained which dyes polyethylene glycol terephthalate very fast to light and thermofixation and which is constituted as follows:

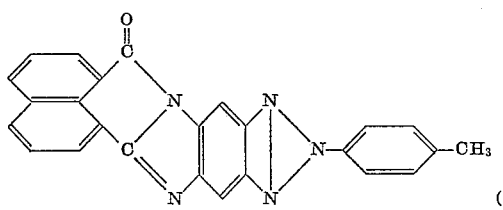

(VII)

Dyes with similar properties are obtained when 2-(3-methylphenyl)-5,6 - diaminobenzotriazole, 2-(2 - methylphenyl)-5,6-diaminobenzotriazole or 2-phenyl-4,5-diaminobenzotriazole are used instead of 2-(4-methylphenyl)-5,6-diaminobenzotriazole. These new dyes have the following formulae:

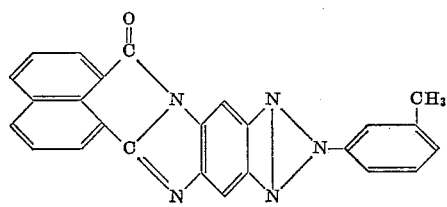

(VIII)

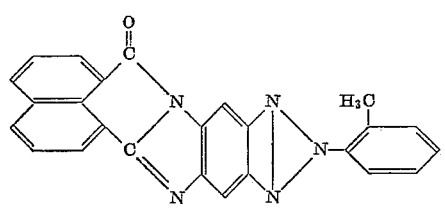

(IX)

and

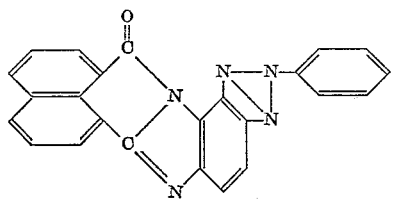

(Xa)

or

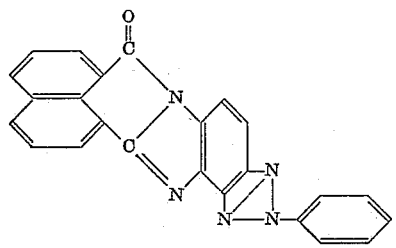

(Xb)

*Example 5*

17 parts of 2-phenyl-5-amino-6-nitrobenzotriazole are boiled together with 14.4 parts of naphthalene-1,8-dicarboxylic acid for six hours in 180 parts of anhydrous nitrobenzene, the mixture is allowed to cool and the filtered-off precipitate is washed with nitrobenzene, methanol and water. After drying, naphthalene-1,8-dicarboxylic acid-(2-phenyl-6-nitrobenzotriazolyl-(5)-imide) is obtained in very good yield in the form of yellowish crystals.

Pyridine or glacial acetic acid may be used instead of nitrobenzene.

A mixture of 10 parts of naphthalene-1,8-dicarboxylic acid-(2-phenyl-6-nitrobenzotriazolyl-(5)-imide) and 2 parts of iron powder is heated to boiling in 120 parts of glacial acetic acid, during the course of an hour 2 parts of iron powder are added twice and the mixture is kept boiling for 4 hours. It is then allowed to cool to 80° C. and the precipitate is filtered off and washed with a little glacial acetic acid and then with water. After drying, a dye is obtained in good yield which is identical with that obtained according to the first paragraph of Example 1.

*Example 6*

A mixture of 17 parts of 2-phenyl-5-amino-6-nitrobenzotriazole, 14.4 parts of naphthalene-1,8-dicarboxylic acid and 200 parts of glacial acetic acid is kept boiling for 6 hours, then 3 times within 1½ hours 5 parts of iron powder are added and the mixture is then boiled for another 4 hours. After cooling to room temperature, the precipitate is filtered off, washed with a little glacial acetic acid and then with water and dried. A dye is obtained which is identical with the dye obtained according to the first paragraph of Example 1.

*Example 7*

A mixture of 10.4 parts of 3-nitronaphthalene-1,8-dicarboxylic acid, 11 parts of 2-phenyl-5,6-diaminobenzotriazole and 125 parts of glacial acetic acid is heated to boiling in the course of an hour and kept at boiling temperature for 3½ hours. It is then allowed to cool to 80° C., filtered and worked up as described in Example 1. After drying, a dye is obtained in good yield which dyes polyethylene glycol terephthalate reddish yellow shades with very good light fastness and very good thermal stability from an aqueous bath at temperatures above 100° C. The new dye has the following formula:

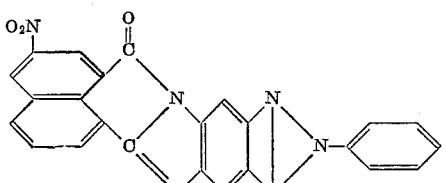

(XIa)

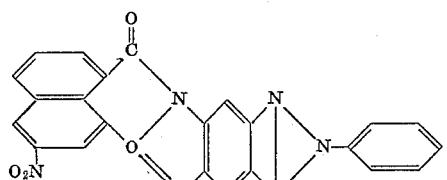

(XIb)

*Example 8*

8.7 parts of naphthalene-1,8-dicarboxylic acid together with 100 parts of glacial acetic acid and 15.9 parts of 2 - (3 - dimethylsulfonylaminophenyl) - 5,6 - diaminobenzotriazole are heated to boiling during an hour and kept at this temperature for 3½ hours. After cooling to 80° C., the precipitate is filtered off and worked up as in Example 1. After drying there is obtained in very good yield a dye which dyes plasticized polyvinyl chloride clear greenish yellow shades with good plasticizer fastness and which is constituted as follows:

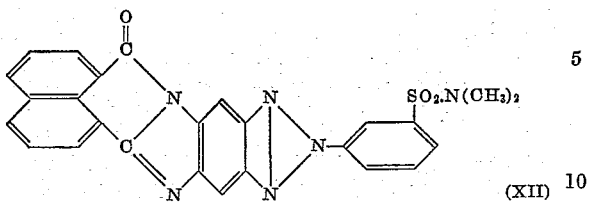

(XII)

By using 2-(4-dimethylsulfonylaminophenyl)-5,6-diaminobenzotriazole instead of 2-(3-dimethylsulfonylaminophenyl)-5,6-diaminobenzotriazole, a dye with similar properties is obtained which has the following structure:

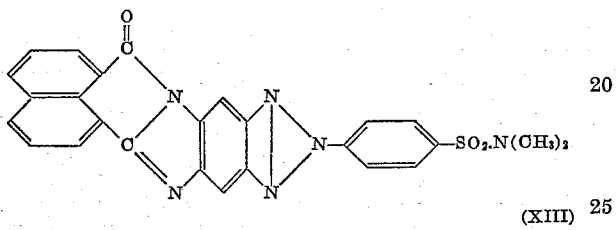

(XIII)

*Example 9*

A mixture of 9.4 parts of 2-phenyl-5,6-diaminobenzotriazole, 7.2 parts of naphthalene-1,8-dicarboxylic acid and 84 parts of nitrobenzene is heated to boiling for 5 hours. The reaction mixture is then allowed to cool to room temperature and worked up in the usual way. A dye is obtained in a good yield which is identical with that obtained according to Example 1.

Instead of nitrobenzene, naphthalene may also be used as solvent.

*Example 10*

9.9 parts of naphthalene-1,8-dicarboxylic acid anhydride are finely dispersed in 200 parts of water by means of 2 parts of normal penta- to octa-decane sulfonic acid sodium salt, then stirred with a mixture of 12.4 parts of 2-phenyl-5,6-diaminobenzotriazole and 120 parts of hot methanol and heated to 170° to 180° C. in a pressure vessel for 6 hours. After cooling, the reaction product is filtered off and washed with water. A dye is obtained in a good yield which, like the dye obtained according to Example 1, dyes fabric of polyethylene terephthalate bright yellow shades with very good fastness properties.

*Example 11*

15 parts of iron powder are introduced within 20 minutes into a boiling mixture of 17 parts of 2-phenyl-5-amino-6-nitrobenzotriazole, 100 parts of ortho-dichlorbenzene and 40 parts of glacial acetic acid. The mixture is then kept at boiling temperature for another hour. The 2-phenyl-5-amino-6-nitrobenzotriazole is thereby reduced to 2-phenyl-5,6-diaminobenzotriazole, 13.2 parts of naphthalene-1,8-dicarboxylic acid anhydride are then added to the mixture and the mixture is stirred for another 5 hours at boiling temperature. After cooling, the reaction product is filtered off by suction, washed with methanol until free from dichlorbenzene, then washed free from iron with 2% aqueous sulfuric acid and finally washed free from acid with water. After drying, a dye is obtained which is identical with the dye obtained according to the first paragraph of Example 1.

By starting from corresponding amounts of 2-(4-chlorphenyl) - 5 - amino - 6 - nitrobenzotriazole, 2 - (xenyl-2) - 5 - amino - 6 - nitrobenzotriazole, 2 - (naphthyl-2) - 5 - amino - 6 - nitrobenzotriazole or 2 - (naphthyl-1)-5-amino-6-nitrobenzotriazole instead of 2-phenyl-5-amino-6-nitrobenzotriazole, and proceeding otherwise as stated above, yellow dyes are obtained which dye textile materials of polyethylene glycol terephthalate with very good fastness properties. These new dyes have the following constitutions:

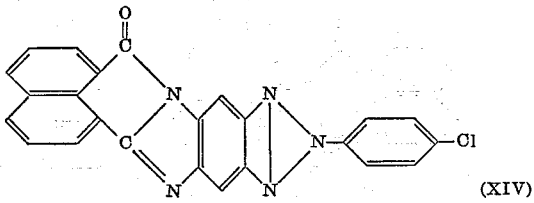

(XIV)

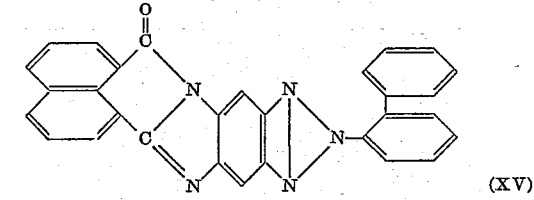

(XV)

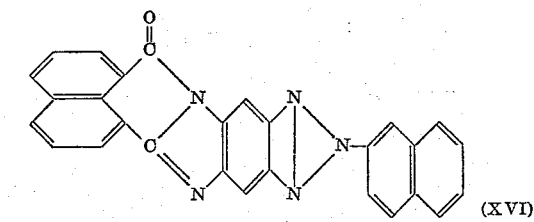

(XVI)

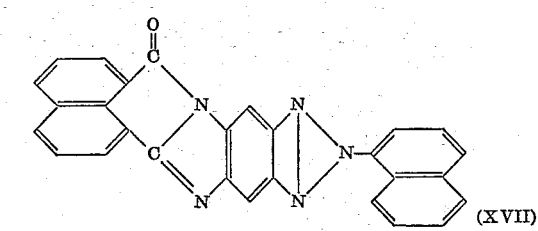

(XVII)

*Example 12*

A mixture of 8.7 parts of naphthalene-1,8-dicarboxylic acid, 13.5 parts of 2-(4-acetylaminophenyl)-5,6-diaminobenzotriazole and 120 parts of glacial acetic acid is heated to boiling and kept at boiling temperature for 3 hours. The mixture is then allowed to cool to 80° C., the reaction product filtered off and washed with a little glacial acetic acid. The filtered product is then washed free from acid with water and dried. The dye thus obtained in a good yield dyes polyester fibers based on terephthalic acid and ethylene glycol yellow shades of very good light and thermofixation fastness. The new dye has the following structure:

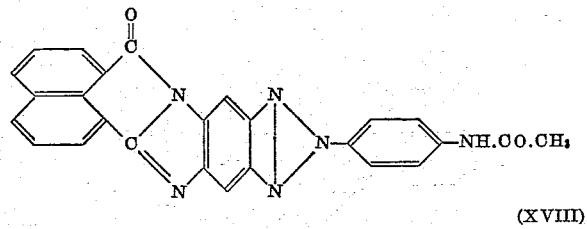

(XVIII)

By starting from the corresponding amount of 2-(4-chlorphenyl) - 5,6 -diaminobenzotriazole instead of 2-(4 - acetylaminophenyl) - 5,6 -diaminotriazole, a dye of the Formula XIV is obtained.

*Example 13*

A mixture of 17 parts of 2-phenyl-5-amino-6-nitrobenzotriazole, 13.2 parts of naphthalene-1,8-dicarboxylic acid anhydride, 200 parts of glacial acetic acid and 15 parts of iron powder is heated to boiling within about one hour. Shortly before reaching the boiling temperature, a strong reaction occurs. The mixture is kept at boiling temperature for about another 3 hours, then allowed to cool to room temperature, the reaction product filtered and washed first with a little glacial acetic acid and then with about 2% aqueous sulfuric acid until the filtrate is free from ions. The material is then washed free from acid and dried. A dye which is identical with the dye obtained according to the first paragraph of Example 1 is thus obtained in a good yield.

The same dye is obtained by heating to boiling a mixture of 17 parts of 2-phenyl-5-amino-6-nitrobenzotriazole, 13.2 parts of naphthalene-1,8-dicarboxylic acid anhydride and 200 parts of glacial acetic acid, then stirring in 15 parts of iron powder in the course of about 10 to 30 minutes and keeping the mixture boiling for about another hour.

Propionic acid may be used instead of acetic acid.

Example 14

A mixture of 150 parts of ortho-dichlorbenzene, 13.2 parts of naphthalene-1,8-dicarboxylic acid anhydride, 17 parts of 2-phenyl-5-amino-6-nitrobenzene and 40 parts of glacial acetic acid is heated to boiling. Then 15 parts of iron powder are introduced in the course of about 20 minutes and the reaction mixture is kept for another 5 hours at boiling temperature. After cooling, the reaction product is filtered off by suction, washed with methanol until free from dichlorbenzene, then washed free from iron with 2% aqueous sulfuric acid and finally washed free from acid with water. After drying, a dye which is identical with the dye obtained in the first paragraph of Example 1 is obtained in a good yield.

Instead of introducing iron powder into the boiling reaction mixture, it may also be added at a lower temperature or prior to heating up.

If the reaction period is prolonged to some hours, for example to 12 hours, a somewhat higher yield of dye is obtained.

Instead of separating the dye from the reaction mixture by filtration, the reaction mixture may also be introduced into about 600 parts of 5% aqueous sulfuric acid and the ortho-dichlorbenzene distilled off with steam. Then the aqueous suspension thus obtained is filtered, the filtered material first washed free from iron and then free from acid and dried.

Monochlorbenzene or naphthalene may be used instead of ortho-dichlorbenzene as the solvent, and propionic acid may be used instead of glacial acetic acid.

Zinc dust may be used instead of iron powder.

Example 15

A mixture of 20.35 parts of 2-(naphthyl-1)-5-amino-6-nitrobenzotriazole, 14.4 parts of naphthalene-1,8-dicarboxylic acid and 200 parts of glacial acetic acid is heated to boiling and then 15 parts of iron powder are added in the course of 1 hour. The mixture is kept at the boiling temperature for another 4 hours, allowed to cool and the reaction product filtered off by suction. The filtered material is washed with glacial acetic acid and water and dried. The dye of Formula XVII is thus obtained in a good yield; it dyes textile material of polyethylene glycol terephthalate bright yellow shades of very good fastness to light and to thermofixation.

By starting from 24.2 parts of 2-(4-dimethylsulfonyl-aminophenyl)-5-amino-6-nitrobenzotriazole instead of from 20.35 parts of 2-(naphthyl-1)-5-amino-6-nitrobenzotriazole, a dye is obtained in a good yield which is identical with that described in the second paragraph of Example 8.

Example 16

A mixture of 38.6 parts of 2-(4-chlorphenyl)-5-amino-6-nitrobenzotriazole, 28.8 parts of naphthalene-1,8-dicarboxylic acid and 450 parts of glacial acetic acid is heated to boiling, 30 parts of iron powder are stirred in in the course of 1 hour and the whole is kept for 4 hours at boiling temperature. After cooling to about 80° C., the reaction material is filtered off by suction, washed with glacial acetic acid and water, and dried. The yellow dye of Formula XIV is obtained in a good yield; it dyes fabric of polyethylene glycol terepthalate with very good fastness properties.

Example 17

A mixture of 16.5 parts of 2-xenyl-5-amino-6-nitrobenzotriazole, 9.9 parts of naphthalene-1,8-dicarboxylic acid anhydride and 200 parts of glacial acetic acid is heated to boiling, 12 parts of iron powder are added in the course of 20 minutes and kept at the boiling temperature for 3 hours. After cooling to room temperature, the reaction product is filtered off by suction, washed with a little glacial acetic acid, then with about 2% aqueous sulfuric acid until free from iron and finally with water until free from acid and dried. The dye of Formula XV is thus obtained in a good yield; it dyes fabric of polyethylene glycol terephthalate yellow shades with very good fastness properties.

Example 18

A mixture of 13.2 parts of naphthalene-1,8-dicarboxylic acid anhydride, 17 parts of 2-phenyl-5-amino-6-nitrobenzotriazole, 150 parts of ortho-dichlorbenzene, 13 parts of concentrated aqueous hydrochloric acid and 5 parts of iron powder is heated to 45° to 50° C., another 10 parts of iron powder are introduced in the course of 10 minutes, the mixture heated to boiling and kept at boiling temperature for 3 hours. While distilling off water, the mixture is further heated within about 1 hour to the boiling point of the ortho-dichlorbenzene and kept for ½ hour at this temperature. After cooling, the reaction mixture is diluted with methanol and filtered. The filtered material is washed with methanol until it is free from ortho-dichlorbenzene, then with 2% aqueous sulfuric acid until free from iron and dried. A yellow dye is obtained in a good yield; it dyes polyester fibers based on ethylene glycol and terephthalic acid with good fastness properties.

Example 19

11 parts of water, 12 parts of iron powder and 0.4 part of glacial acetic acid are heated together to 80° C. and kept at this temperature for about 1 hour. 100 parts of ortho-dichlorbenzene, 17.5 parts of 2-phenyl-5-amino-6-nitrobenzotriazole and 13.2 parts of naphthalene-1,8-dicarboxylic acid anhydride are then added, heated to 95° to 100° C. and the mixture is kept at this temperature for 2 hours. The reaction mixture is heated for another hour to boiling (the temperature being 105° to 110° C.) and the temperature is raised to about 120° C. while distilling off water. At this temperature the reaction mixture is stirred for 5 hours. After cooling it is then diluted with 100 parts of methanol and filtered. The filtered material is washed free from ortho-dichlorbenzene with methanol and then with dilute aqueous hydrochloric acid until it is free from iron and dried. A yellow dye is obtained which dyes fabric of polyethylene glycol terephthalate with good fastness properties.

Example 20

30 parts of iron powder are stirred within about 20 minutes into a boiling mixture of 17.4 parts of 3-nitronaphthalene-1,8-dicarboxylic acid, 200 parts of glacial acetic acid and 17 parts of 2-phenyl-5-amino-6-nitrobenzotriazole and the mixture is kept at boiling temperature for 3 hours. After cooling to room temperature, the reaction product is filtered off by suction, washed with a little glacial acetic acid and then with about 2% aqueous sulfuric acid until free from iron and then with water until free from acid. After drying, a yellow dye is obtained with a good yield; it dyes fabric of polyethylene glycol terephthalate with good fastness properties. This dye bears a primary amino group, because the nitro group of the 3-nitronaphthalene-1,8-dicarboxylic acid is reduced to the amino group by the reaction, and is constructed as follows:

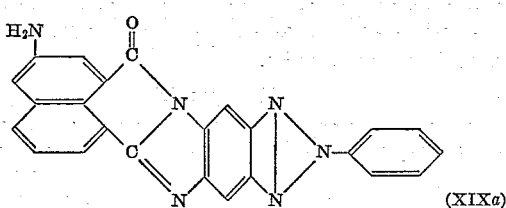
(XIXa)

or

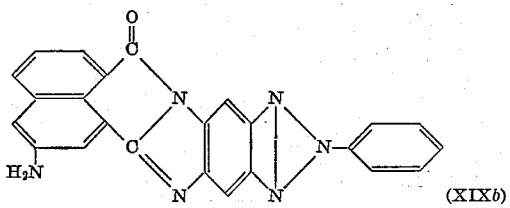
(XIXb)

If it is desired to acetylate the dye at these amino groups, the following procedure may be followed:

After the reaction mixture has been kept for 3 hours at boiling temperature, 76 parts of acetic anhydride are introduced and the mixture is heated to boiling for another 2 hours. The reaction product is separated as described above. A dye is thus obtained which dyes textile material of polyethylene glycol terephthalate with very good fastness properties bright yellow shades and which has the following formula:

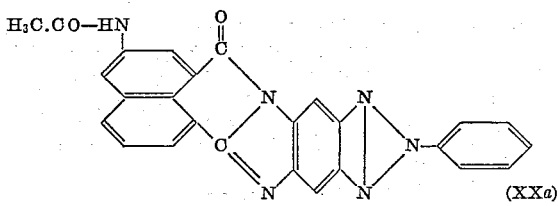
(XXa)

or

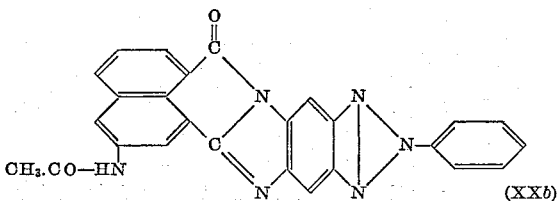
(XXb)

Similar dyes are obtained by starting from the same amount of 4-nitronaphthalene-1,8-dicarboxylic acid instead of 3-nitronaphthalene-1,8-dicarboxylic acid and proceeding otherwise as previously described. These dyes have the following structures:

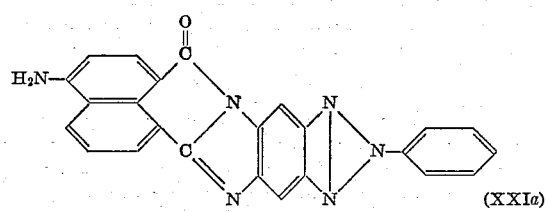
(XXIa)

or

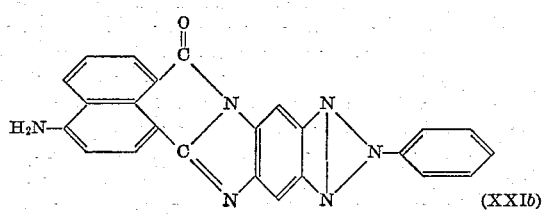
(XXIb)

and

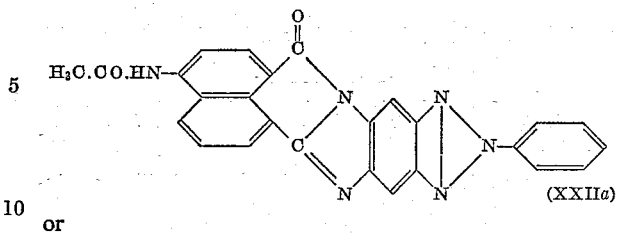
(XXIIa)

or

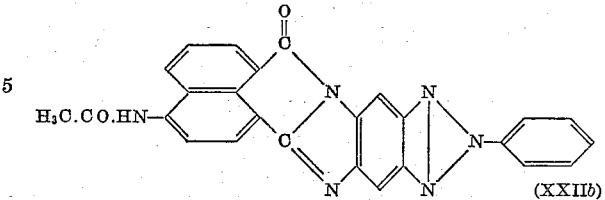
(XXIIb)

I claim:
1. Dyes of the perinaphthoylene-benzimidazole series having the formula

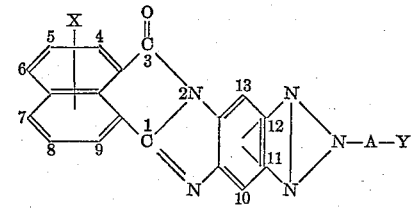

in which X represents a member selected from the class consisting of hydrogen, nitro, amino and acetylamino in one of the positions 5, 6, 7 and 8, the triazole ring in the formula being connected with the benzene ring of the perinaphthoylene-benzimidazole moiety in one of the positions (10, 11), (11, 12) and (12, 13) and in which A represents a member selected from the class consisting of phenylene, naphthalene and biphenylene, and Y represents a member selected from the class consisting of hydrogen, lower alkyl, lower alkoxy, halogen, acetylamino, N,N-dimethylamidosulfonyl and phenyl.

2. The dye of the formula:

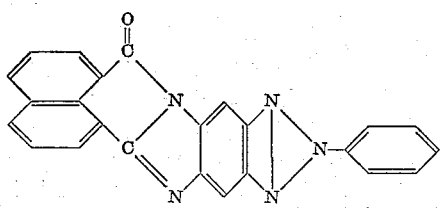

3. The dye of the formula:

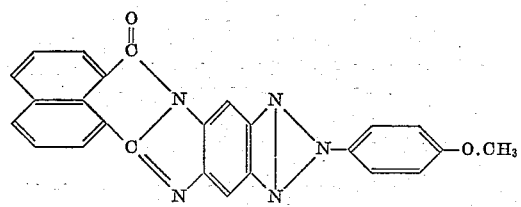

4. The dye of the formula:

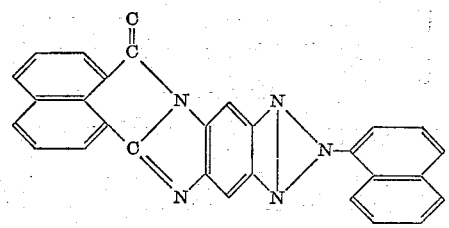

No references cited.

UNITED STATES PATENT OFFICE
CERTIFICATE OF CORRECTION

Patent No. 3,051,711                              August 28, 1962

Fritz Graser

It is hereby certified that error appears in the above numbered patent requiring correction and that the said Letters Patent should read as corrected below.

Column 1, line 29, for "perinapthoylene" read -- perinaphthoylene --; column 9, line 5, after "from", first occurrence, insert -- iron --.

Signed and sealed this 15th day of January 1963.

SEAL)
Attest:

ERNEST W. SWIDER                                   DAVID L. LADD
Attesting Officer                                    Commissioner of Patents